(12) United States Patent
Sundaram et al.

(10) Patent No.: US 11,557,281 B2
(45) Date of Patent: Jan. 17, 2023

(54) CONFIDENCE CLASSIFIER WITHIN CONTEXT OF INTENT CLASSIFICATION

(71) Applicant: Genesys Cloud Services, Inc., Menlo Park, CA (US)

(72) Inventors: Ramasubramanian Sundaram, Hyderabad (IN); Pavan Buduguppa, Hyderabad (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 26 days.

(21) Appl. No.: 17/135,114

(22) Filed: Dec. 28, 2020

(65) Prior Publication Data

US 2022/0208178 A1   Jun. 30, 2022

(51) Int. Cl.
| | | |
|---|---|---|
| *G10L 15/18* | (2013.01) | |
| *G10L 15/10* | (2006.01) | |
| *H04L 51/02* | (2022.01) | |
| *G10L 15/22* | (2006.01) | |

(52) U.S. Cl.
CPC .............. *G10L 15/10* (2013.01); *G10L 15/22* (2013.01); *H04L 51/02* (2013.01); *G10L 15/1815* (2013.01); *G10L 15/1822* (2013.01)

(58) Field of Classification Search
CPC . G06N 5/041; G10L 15/1822; G10L 15/1815; G10L 15/16
See application file for complete search history.

(56) References Cited

U.S. PATENT DOCUMENTS

| | | | |
|---|---|---|---|
| 2004/0001633 A1* | 1/2004 | Caviedes | .............. G06T 7/0004 382/280 |
| 2008/0106404 A1 | 5/2008 | Joslin et al. | |
| 2011/0289025 A1 | 11/2011 | Yan et al. | |
| 2012/0053945 A1 | 3/2012 | Gupta et al. | |
| 2013/0156255 A1* | 6/2013 | Varadharajan | ....... H04N 1/3216 382/100 |
| 2014/0101119 A1 | 4/2014 | Li et al. | |
| 2015/0310862 A1* | 10/2015 | Dauphin | ................. G06F 40/30 704/257 |
| 2019/0370629 A1* | 12/2019 | Liu | ........................ G06N 5/041 |

OTHER PUBLICATIONS

International Search Report and Written Opinion of the International Searching Authority; The International Searching Authority; International Application No. PCT/US2021/054380; dated Jan. 18, 2022; 7 pages.
Saini, Mohit; Using the DIET classifier for intent classification in dialogue; Medium; Jul. 28, 2020; 13 pages; available at https://medium.com/the-research-nest/using-the-diet-classifier-for-intent-classification-in-dialogue-489c76e62804.

* cited by examiner

*Primary Examiner* — Feng-Tzer Tzeng
(74) *Attorney, Agent, or Firm* — Taft Stettinius & Hollister LLP (57) ABSTRACT

A method of applying a confidence classifier for intent classification in association with an automated chat bot according to an embodiment includes processing, by a computing system, an utterance with an intent classifier to determine a probability distribution of possible intents associated with the utterance, generating, by the computing system, a plurality of measures of peakedness of the probability distribution, and applying, by the computing system, a trained confidence classifier to determine a single normalized probability of a most likely intent associated with the utterance based on the plurality of measures of peakedness of the probability distribution.

16 Claims, 6 Drawing Sheets

CONFIDENCE CLASSIFIER WITHIN CONTEXT OF INTENT CLASSIFICATION

BACKGROUND

Intent classification is an important feature of typical natural language understanding (NLU) systems. An intent classifier generally receives the user's voice in a transcribed format (or text input), and outputs the probabilities that the user's utterance is associated with particular predefined intents. For example, a user interface associated with an airline agency may allow four options: book a ticket, cancel a ticket, obtain flight information, and obtain the airline luggage policy. An intent classifier for such an interface may receive the user's text/voice input and analyze that input to determine which of the four options the user most likely intended to select. As the number of options increases, ascertaining the true user intent is often further complicated.

SUMMARY

One embodiment is directed to a unique system, components, and methods for applying a confidence classifier for intent classification in association with an automated chat bot. Other embodiments are directed to apparatuses, systems, devices, hardware, methods, and combinations thereof for applying a confidence classifier for intent classification in association with an automated chat bot.

According to an embodiment, a method of applying a confidence classifier for intent classification in association with an automated chat bot may include processing, by a computing system, an utterance with an intent classifier to determine a probability distribution of possible intents associated with the utterance, generating, by the computing system, a plurality of measures of peakedness of the probability distribution, and applying, by the computing system, a trained confidence classifier to determine a single normalized probability of a most likely intent associated with the utterance based on the plurality of measures of peakedness of the probability distribution.

In some embodiments, the method may further include comparing, by the computing system, the normalized probability of the most likely intent associated with the utterance to a confidence threshold.

In some embodiments, the method may further include selecting, by the computing system, the most likely intent as an intent associated with the utterance in response to determining that the normalized probability of the most likely intent associated with the utterance satisfies the confidence threshold, and transmitting, by the computing system, a message to a user device in communication with the automated chat bot in response to selecting the most likely intent as the intent associated with the utterance, wherein the message is a response to the utterance.

In some embodiments, generating the plurality of measures of peakedness of the probability distribution may include sorting probability scores of the probability distribution in descending order, selecting a subset of the greatest probabilities of the sorted probability scores as a probability set, determining a plurality of ratios of consecutively ranked probabilities in the probability set, determining a kurtosis score of the probabilities in the probability set, determining an entropy of the probability distribution, and normalizing the entropy of the probability distribution by dividing the entropy by a maximum possible entropy of the probability distribution to generate a normalized entropy.

In some embodiments, generating the plurality of measures of peakedness of the probability distribution may include applying a sigmoid function to each of the plurality of ratios, the kurtosis score, and the normalized entropy.

In some embodiments, selecting the subset of the greatest probabilities of the sorted probability scores as the probability set may include selecting five greatest probabilities of the sorted probabilities scores as the probability set.

In some embodiments, generating the plurality of measures of peakedness of the probability distribution may include determining a kurtosis score of the probability distribution.

In some embodiments, generating the plurality of measures of peakedness of the probability distribution may include determining an entropy of the probability distribution.

In some embodiments, generating the plurality of measures of peakedness of the probability distribution may include ranking probabilities of the probability distribution by greatest probability, and determining a plurality of ratios of consecutively ranked probabilities in response to ranking the probabilities of the probability distribution.

In some embodiments, the method may further include training, by the computing system, the confidence classifier by tuning parameters using stochastic gradient descent optimization.

According to another embodiment, a system for applying a confidence classifier for intent classification in association with an automated chat bot may include at least one processor, and at least one memory comprising a plurality of instructions stored thereon that, in response to execution by the at least one processor, causes the system to process an utterance with an intent classifier to determine a probability distribution of possible intents associated with the utterance, generate a plurality of measures of peakedness of the probability distribution, and apply a trained confidence classifier to determine a single normalized probability of a most likely intent associated with the utterance based on the plurality of measures of peakedness of the probability distribution.

In some embodiments, the plurality of instructions may further cause the system to compare the normalized probability of the most likely intent associated with the utterance to a confidence threshold.

In some embodiments, the plurality of instructions may further cause the system to select the most likely intent as an intent associated with the utterance in response to a determination that the normalized probability of the most likely intent associated with the utterance satisfies the confidence threshold, and transmit a message to a user device in communication with the automated chat bot in response to selection of the most likely intent as the intent associated with the utterance, wherein the message is a response to the utterance.

In some embodiments, to generate the plurality of measures of peakedness of the probability distribution may include to sort probability scores of the probability distribution in descending order, select a subset of the greatest probabilities of the sorted probability scores as a probability set, determine a plurality of ratios of consecutively ranked probabilities in the probability set, determine a kurtosis score of the probabilities in the probability set, determine an entropy of the probability distribution, and normalize the entropy of the probability distribution by dividing the entropy by a maximum possible entropy of the probability distribution to generate a normalized entropy.

In some embodiments, to generate the plurality of measures of peakedness of the probability distribution may include to apply a sigmoid function to each of the plurality of ratios, the kurtosis score, and the normalized entropy.

In some embodiments, to select the subset of the greatest probabilities of the sorted probability scores as the probability set may include to select five greatest probabilities of the sorted probabilities scores as the probability set.

In some embodiments, to generate the plurality of measures of peakedness of the probability distribution may include to determine a kurtosis score of the probability distribution.

In some embodiments, to generate the plurality of measures of peakedness of the probability distribution may include to determine an entropy of the probability distribution.

In some embodiments, to generate the plurality of measures of peakedness of the probability distribution may include to rank probabilities of the probability distribution by greatest probability, and determine a plurality of ratios of consecutively ranked probabilities in response to ranking the probabilities of the probability distribution.

In some embodiments, the plurality of instructions may further cause the system to train the confidence classifier by tuning parameters using stochastic gradient descent optimization.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
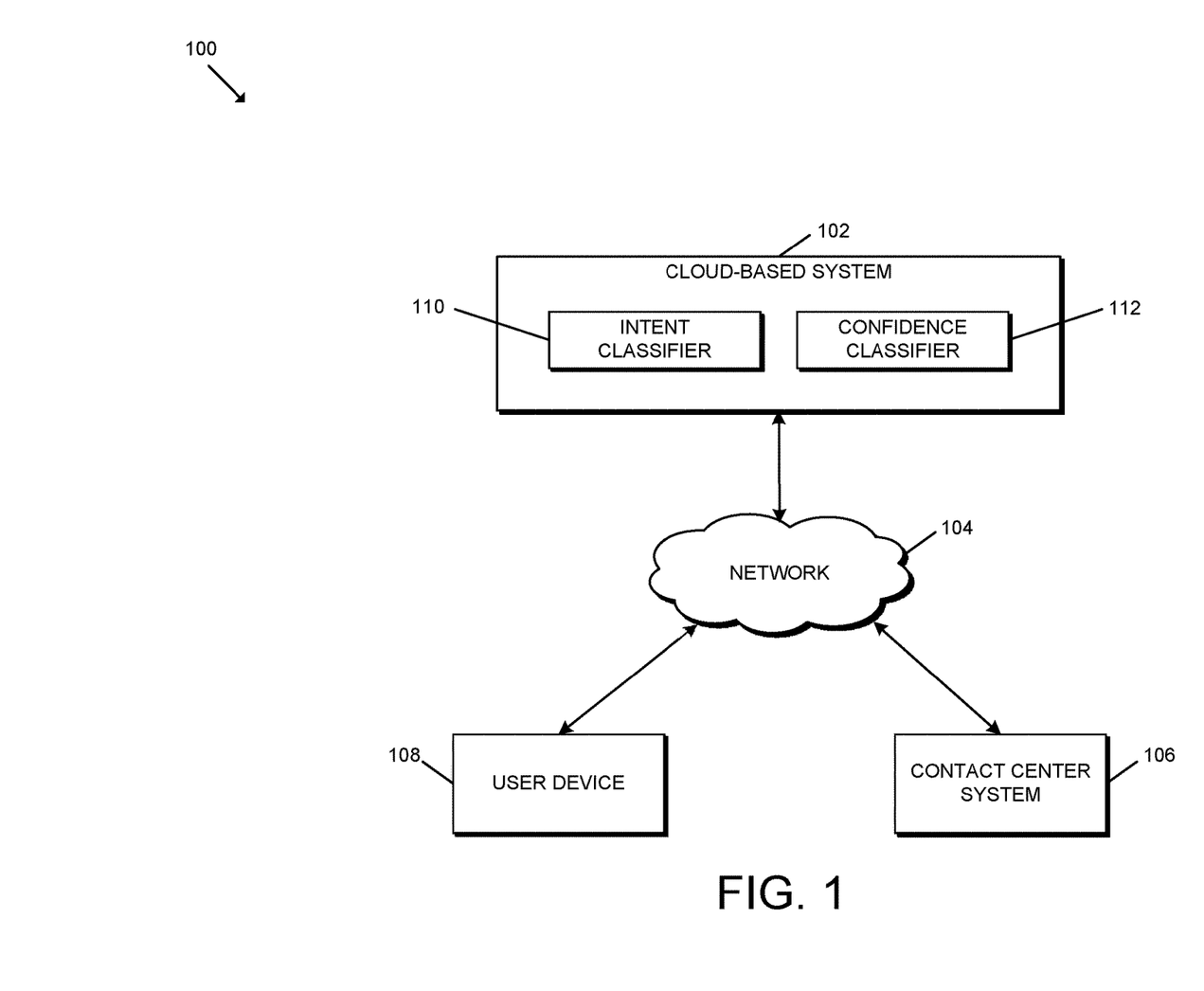
FIG. 1 is a simplified block diagram of at least one embodiment of a system for applying a confidence classifier for intent classification.

Referring now to FIG. 1, in the illustrative embodiment, a system 100 for applying a confidence classifier for intent classification includes a cloud-based system 102, a network 104, a contact center system 106, and a user device 108. Additionally, the illustrative cloud-based system 102 includes an intent classifier 110 and a confidence classifier 112. Although only one cloud-based system 102, one network 104, one contact center system 106, one user device 108, one intent classifier 110, and one confidence classifier 112 are shown in the illustrative embodiment of FIG. 1, the system 100 may include multiple cloud-based systems 102, networks 104, contact center systems 106, user devices 108, intent classifiers 110, and/or confidence classifiers 112 in other embodiments. For example, in some embodiments, multiple cloud-based systems 102 (e.g., related or unrelated systems) may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent.

In some systems, an NLU author/admin may train the intent classifier with a supervised learning approach by supplying it with a training set of utterances mapped to intent labels. These utterances may be transformed into dense vectors (e.g., an array of floating point numbers) capable of being processed before optimizing for the intent classifier's parameters (e.g., via the training process). Once completed, the trained model may be leveraged when users provide input text utterances, which in turn are processed using the same feature generator used during the classifier's training process to enable the intent classifier to predict a set of probabilities against possible intents. The input may come, for example, from a dialog management system, chat bot, personal bot, or other system, and the classifier may provide the probabilities to the system such that it may determine the best course of action in response.

The range of output probabilities in the range of 0.0 to 1.0 may cause considerable ambiguity for systems that depend on the intent classifier's output. For example, suppose that an intent classifier has been trained to recognize three intents, and the downstream consuming system has calibrated a certain response if the highest probability is 0.7 (e.g., the confidence threshold). If each of the possible intents is equiprobable, the probability of each intent would be approximately 0.33. However, if the number of possible intents increases to four, the probability of each equiprobable case would be 0.25 instead of 0.33. As the number of possible intents increases, the probabilities for the individual intents continues to reduce. This significantly attenuates the individual probabilities and, therefore, the highest probability is typically lower. Further, the differing number of intents may make setting/defining the confidence threshold a moving target.

The system 100 and technologies described herein allow for improved confidence classification in the context of intent classification (e.g., based on user communication with a chat bot or personal bot), which addresses the problem of lower probabilities associated with a large number of possible intents. As described herein, the output probability distribution can essentially be used to measure the confidence of the intent classifier in predicting an input utterance to intent mapping based on measurements of peakedness of the probability distribution. A confidence classifier is trained and then used in real time to convert the output probabilities from the intent classifier into a normalized output value in the range of 0.0 to 1.0, which serves as a proxy for the output probability of the intent classifier's best possible intent probability. Accordingly, the confidence threshold may also be set and maintained in the 0.0 to 1.0 range, such that it is no longer necessary to change the threshold based on the number of possible intent options.

It should be appreciated that each of the cloud-based system 102, network 104, contact center system 106, user device 108, intent classifier 110, and confidence classifier 112 may be embodied as any type of device/system, collection of devices/systems, or portion(s) thereof suitable for performing the functions described herein.

The cloud-based system 102 may be embodied as any one or more types of devices/systems capable of performing the functions described herein. For example, in the illustrative embodiment, the cloud-based system 102 is configured to receive user input data indicative of the user's utterance and process the user input data (e.g., using the intent classifier 110 and the confidence classifier 112) to determine the most likely user intent associated with that utterance and the corresponding confidence in the system's prediction, which may be used (e.g., by other systems) to make decisions. As described herein, the intent classifier 110 of the cloud-based system 102 is configured to process the user input data associated with the user's utterance and output the corresponding probability that the user's utterance corresponds with each of the possible predefined intents analyzed by the intent classifier 110. The confidence classifier 112 further analyzes the probability distribution output by the intent classifier 110 to generate a plurality of measures of peakedness of the probability distribution (e.g., ratios, kurtosis scores, entropy, etc.) and determine a single normalized probability of a most likely intent associated with the utterance based on those measures of peakedness.

Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In some embodiments, the cloud-based system 102 may be embodied as, or similar to, the cloud-based system 200 described in reference to FIG. 2.

In cloud-based embodiments, the cloud-based system 102 may be embodied as a server-ambiguous computing solution, for example, that executes a plurality of instructions on-demand, contains logic to execute instructions only when prompted by a particular activity/trigger, and does not consume computing resources when not in use. That is, system 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 102 described herein. For example, when an event occurs (e.g., data is transferred to the system 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system 102), the appropriate virtual function(s) may be executed to perform the actions before eliminating the instance of the virtual function(s).

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108, 110, 112 of the system 100. It should be appreciated that the various devices/systems 102, 106, 108, 110, 112 may communicate with one another via different networks 104 depending on the source and/or destination devices/systems 102, 106, 108, 110, 112.

In some embodiments, it should be appreciated that the cloud-based system 102 may be communicatively coupled to the contact center system 106, form a portion of the contact center system 106, and/or be otherwise used in conjunction with the contact center system 106. For example, the contact center system 106 may include a chat bot (e.g., similar to the chat bot 218 of FIG. 2) configured to communicate with a user (e.g., via the user device 108). Further, in some embodiments, the user device 108 may communicate directly with the cloud-based system 102.

The contact center system 106 may be embodied as any system capable of providing contact center services (e.g., call center services) to an end user and otherwise performing the functions described herein. Depending on the particular embodiment, it should be appreciated that the contact center system 106 may be located on the premises/campus of the organization utilizing the contact center system 106 and/or located remotely relative to the organization (e.g., in a cloud-based computing environment). In some embodiments, a portion of the contact center system 106 may be located on the organization's premises/campus while other portions of the contact center system 106 are located remotely relative to the organization's premises/campus. As such, it should be appreciated that the contact center system 106 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 106 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

The user device 108 may be embodied as any type of device capable of executing an application and otherwise performing the functions described herein. For example, in some embodiments, the user device 108 is configured to execute an application to participate in a conversation with a personal bot, automated agent, chat bot, or other automated system. As such, the user device 108 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

It should be appreciated that each of the cloud-based system 102, the network 104, the contact center system 106, and/or the user device 108 may be embodied as (and/or include) one or more computing devices similar to the computing device 300 described below in reference to FIG. 3. For example, in the illustrative embodiment, each of the cloud-based system 102, the network 104, the contact center system 106, and/or the user device 108 may include a processing device 302 and a memory 306 having stored thereon operating logic 308 (e.g., a plurality of instructions) for execution by the processing device 302 for operation of the corresponding device.

Figure 2:
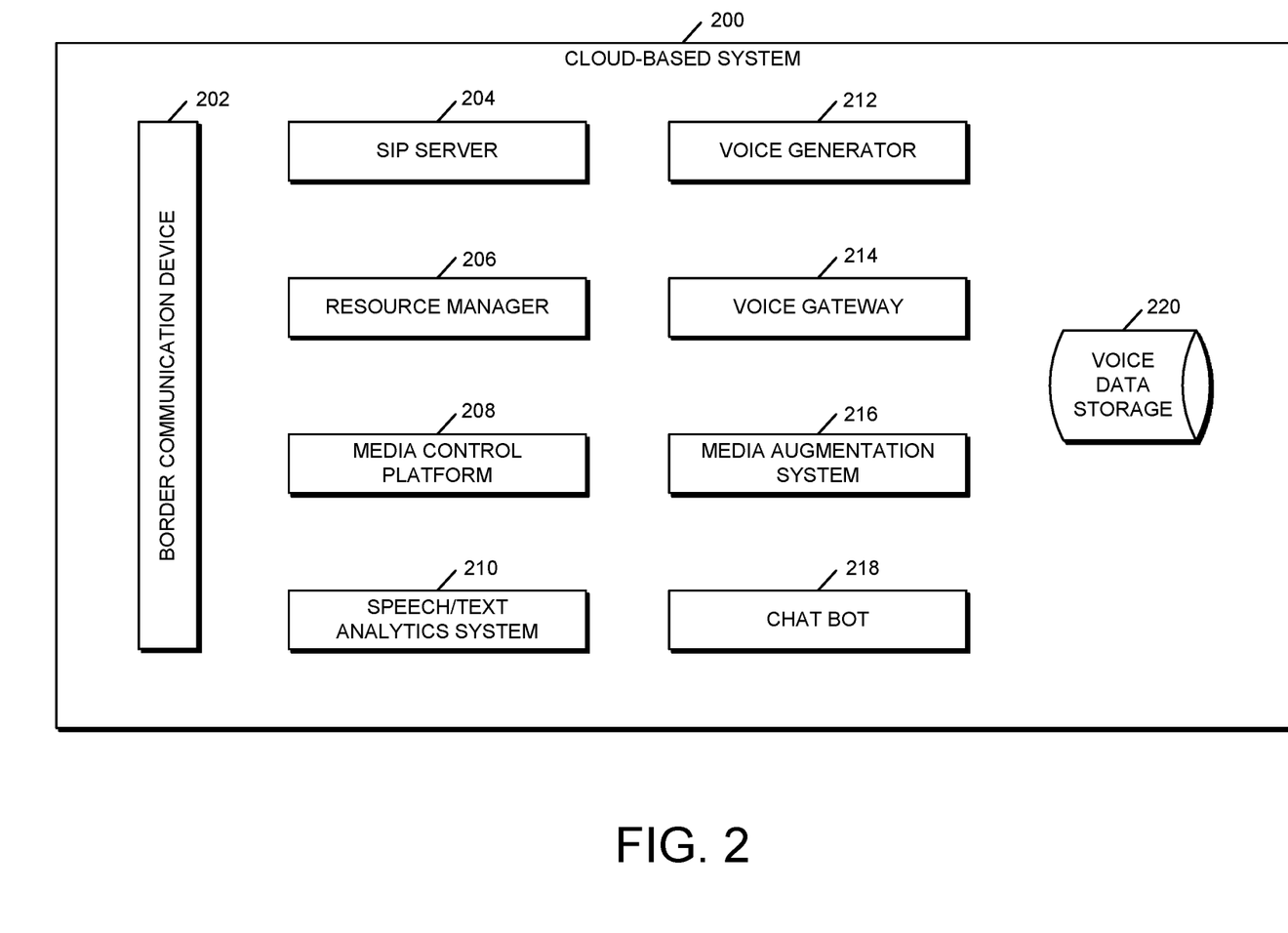
FIG. 2 is a simplified block diagram of at least one embodiment of a cloud-based system.

Referring now to FIG. 2, a simplified block diagram of at least one embodiment cloud-based system 200 is shown. The illustrative cloud-based system 200 includes a border communication device 202, a SIP server 204, a resource manager 206, a media control platform 208, a speech/text analytics system 210, a voice generator 212, a voice gateway 214, a media augmentation system 216, a chat bot 218, and voice data storage 220. Although only one border communication device 202, one SIP server 204, one resource manager 206, one media control platform 208, one speech/text analytics system 210, one voice generator 212, one voice gateway 214, one media augmentation system 216, one chat bot 218, and one voice data storage 220 are shown in the illustrative embodiment of FIG. 2, the cloud-based system 200 may include multiple border communication devices 202, SIP servers 204, resource managers 206, media control platforms 208, speech/text analytics systems 210, voice generators 212, voice gateways 214, media augmentation systems 216, chat bots 218, and/or voice data storages 220 in other embodiments. For example, in some embodiments, multiple chat bots 218 may be used to communicate regarding different subject matters handled by the same cloud-based system 200. Further, in some embodiments, one or more of the components described herein may be excluded from the system 200, one or more of the components described as being independent may form a portion of another component, and/or one or more of the component described as forming a portion of another component may be independent.

The border communication device 202 may be embodied as any one or more types of devices/systems that are capable of performing the functions described herein. For example, in some embodiments, the border communication device 202 may be configured to control signaling and media streams involved in setting up, conducting, and tearing down voice conversations and other media communications between, for example, an end user and contact center system. In some embodiments, the border communication device 202 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

In some embodiments, the border communication device 202 may operate according to a standard SIP back-to-back user agent (B2BUA) configuration. In this regard, the border communication device 202 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 202 may exert control over the signaling (e.g., SIP messages) and media streams (e.g., RTP data) routed to and from an end user device (e.g., the user device 108) and a contact center system (e.g., the contact center system 106) that traverse the network (e.g., the network 104). In this regard, the border communication device 202 may be coupled to trunks that carry signals and media for calls to and from the user device over the network, and to trunks that carry signals and media to and from the contact center system over the network.

The SIP server 204 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 204 in other embodiments. The SIP server 204 may be a separate logical component or may be combined with the resource manager 206. In some embodiments, the SIP server 204 may be hosted at a contact center system (e.g., the contact center system 106). Although a SIP server 204 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 206 may be embodied as any one or more types of devices/systems that are capable of performing the functions described herein. In the illustrative embodiment, the resource manager 206 may be configured to allocate and monitor a pool of media control platforms for providing load balancing and high availability for each resource type. In some embodiments, the resource manager 206 may monitor and may select a media control platform 208 from a cluster of available platforms. The selection of the media control platform 208 may be dynamic, for example, based on identification of a location of a calling end user, type of media services to be rendered, detected quality of a current media service, and/or other factors.

In some embodiments, the resource manager 206 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 206 may be configured to act as a SIP proxy, a SIP registrar, and/or a SIP notifier. In this regard, the resource manager 206 may act as a proxy for SIP traffic between two SIP components. As a SIP registrar, the resource manager 206 may accept registration of various resources via, for example, SIP REGISTER messages. In this manner, the cloud-based system 200 may support transparent relocation of call-processing components. In some embodiments, components such as the media control platform 208 do not register with the resource manager 206 at startup. The resource manager 206 may detect instances of the media control platform 208 through configuration information retrieved from the configuration database. If the media control platform 208 has been configured for monitoring, the resource manager 206 may monitor resource health by using, for example, SIP OPTIONS messages. In some embodiments, to determine whether the resources in the group are alive, the resource manager 206 may periodically send SIP OPTIONS messages to each media control platform 208 resource in the group. If the resource manager 206 receives an OK response, the resources are considered alive. It should be appreciated that the resource manager 206 may be configured to perform other various functions, which have been omitted for brevity of the description. The resource manager 206 and the media control platform 208 may collectively be referred to as a media controller.

In some embodiments, the resource manager 206 may act as a SIP notifier by accepting, for example, SIP SUBSCRIBE requests from the SIP server 204 and maintaining multiple independent subscriptions for the same or different SIP devices. The subscription notices are targeted for the tenants that are managed by the resource manager 206. In this role, the resource manager 206 may periodically generate SIP NOTIFY requests to subscribers (or tenants) about port usage and the number of available ports. The resource manager 206 may support multi-tenancy by sending notifications that contain the tenant name and the current status (in- or out-of-service) of the media control platform 208 that is associated with the tenant, as well as current capacity for the tenant.

The media control platform 208 may be embodied as any service or system capable of providing media services and otherwise performing the functions described herein. For example, in some embodiments, the media control platform 208 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 208 and the end user.

The speech/text analytics system (STAS) 210 may be embodied as any service or system capable of providing various speech analytics and text processing functionalities (e.g., text-to-speech) as will be understood by a person of skill in the art and otherwise performing the functions described herein. The speech/text analytics system 210 may perform automatic speech and/or text recognition and grammar matching for end user communications sessions that are handled by the cloud-based system 200. The speech/text analytics system 210 may include one or more processors and instructions stored in machine-readable media that are executed by the processors to perform various operations. In some embodiments, the machine-readable media may include non-transitory storage media, such as hard disks and hardware memory systems.

The voice generator 212 may be embodied as any service or system capable of generating a voice communication and otherwise performing the functions described herein. In some embodiments, the voice generator 212 may generate the voice communication based on a particular voice signature.

The voice gateway 214 may be embodied as any service or system capable of performing the functions described herein. In the illustrative embodiment, the voice gateway 214 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 214 or from other storage media in the cloud-based system 200. In some embodiments, the voice gateway 214 may process voice programs that are script-based voice applications. The voice program, therefore, may be a script written in a scripting language, such as voice extensible markup language (VoiceXML) or speech application language tags (SALT). The cloud-based system 200 may also communicate with the voice data storage 220 to read and/or write user interaction data (e.g., state variables for a data communications session) in a shared memory space.

The media augmentation system 216 may be embodied as any service or system capable of specifying how the portions of the cloud-based system 200 (e.g., one or more of the border communications device 202, the SIP server 204, the resource manager 206, the media control platform 208, the speech/text analytics system 210, the voice generator 212, the voice gateway 214, the media augmentation system 216, the chat bot 218, the voice data storage 220, and/or one or more portions thereof) interact with each other and otherwise performing the functions described herein. In some embodiments, the media augmentation system 216 may be embodied as or include an application program interface (API). In some embodiments, the media augmentation system 216 enables integration of differing parameters and/or protocols that are used with various planned application and media types utilized within the cloud-based system 200.

The chat bot 218 may be embodied as any automated service or system capable of using automation to engage with end users and otherwise performing the functions described herein. For example, in some embodiments, the chat bot 218 may operate, for example, as an executable program that can be launched according to demand for the particular chat bot. In some embodiments, the chat bot 218 simulates and processes human conversation (either written or spoken), allowing humans to interact with digital devices as if the humans were communicating with another human. In some embodiments, the chat bot 218 may be as simple as rudimentary programs that answer a simple query with a single-line response, or as sophisticated as digital assistants that learn and evolve to deliver increasing levels of personalization as they gather and process information. In some embodiments, the chat bot 218 includes and/or leverages artificial intelligence, adaptive learning, bots, cognitive computing, and/or other automation technologies. Chat bot 218 may also be referred to herein as one or more chat robots, AI chat bots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

The voice data storage 220 may be embodied as one or more databases, data structures, and/or data storage devices capable of storing data in the cloud-based system 200 or otherwise facilitating the storage of such data for the cloud-based system 200. For example, in some embodiments, the voice data storage 220 may include one or more cloud storage buckets. In other embodiments, it should be appreciated that the voice data storage 220 may, additionally or alternatively, include other types of voice data storage mechanisms that allow for dynamic scaling of the amount of data storage available to the cloud-based system 200. In some embodiments, the voice data storage 220 may store scripts (e.g., pre-programmed scripts or otherwise). Although the voice data storage 220 is described herein as data storages and databases, it should be appreciated that the voice data storage 220 may include both a database (or other type of organized collection of data and structures) and data storage for the actual storage of the underlying data. The voice data storage 220 may store various data useful for performing the functions described herein.

Figure 3:
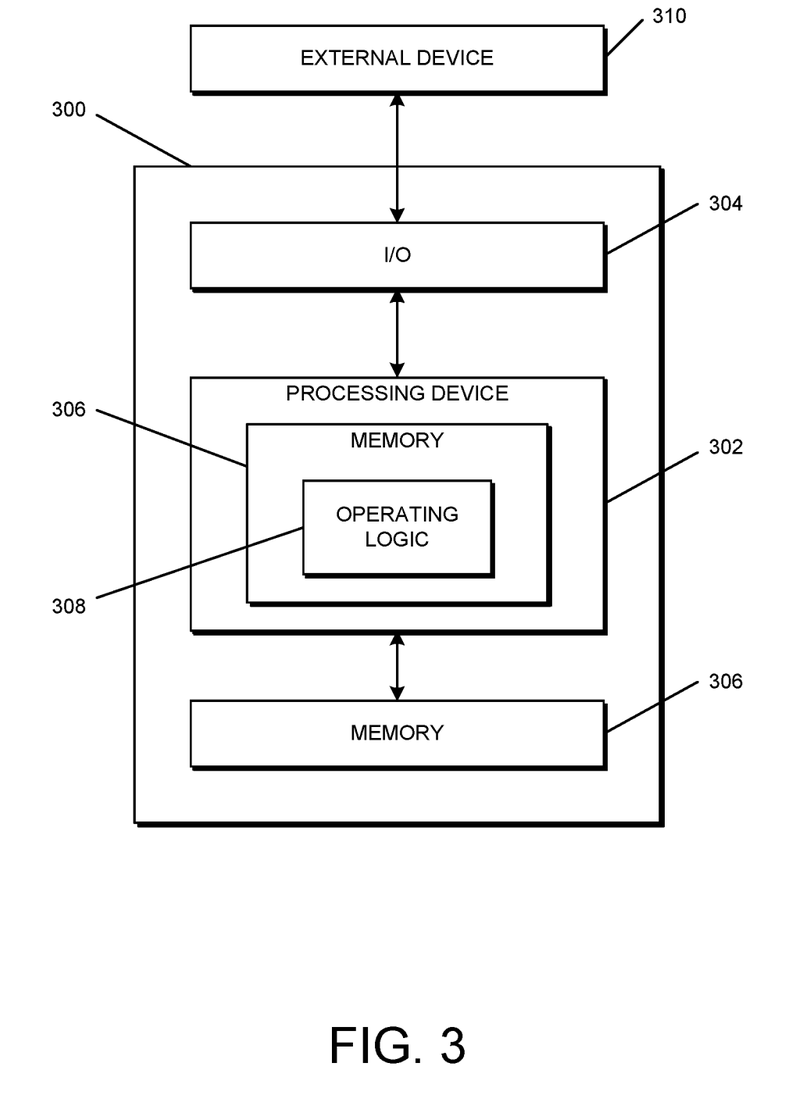
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of a cloud-based system, contact center system, and/or user device that may be utilized in connection with the cloud-based system 102, the contact center system 106, and/or the user device 108 (and/or a portion thereof) illustrated in FIG. 1. Further, in some embodiments, one or more of the border communications device 202, the SIP server 204, the resource manager 206, the media control platform 208, the speech/text analytics system 210, the voice generator 212, the voice gateway 214, the media augmentation system 216, the chat bot 218, and/or the voice data storage 220 (and/or a portion thereof) may be embodied as or executed by a computing device similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the cloud-based system 102, the contact center system 106, the user device 108, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
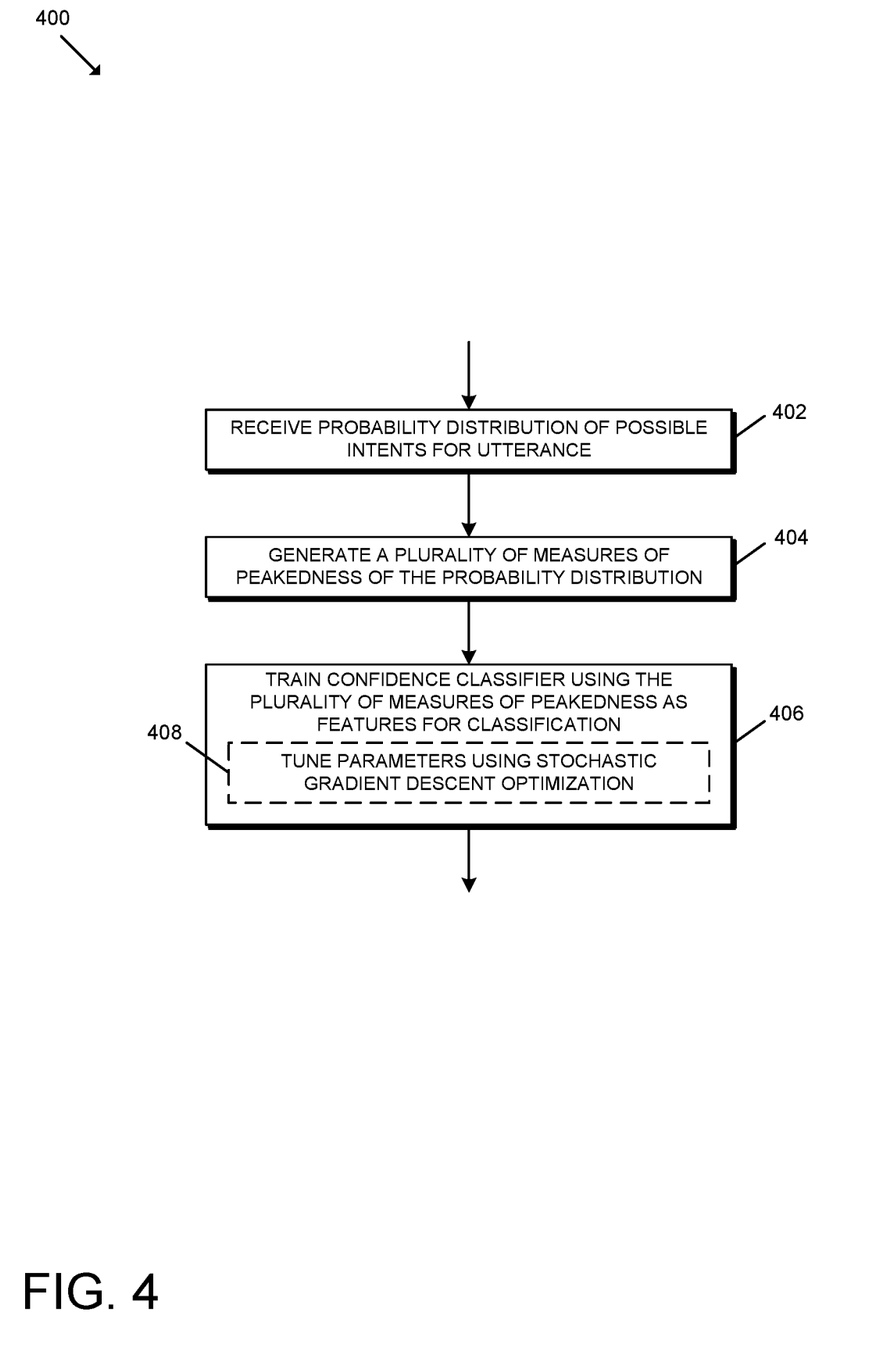
FIG. 4 is a simplified flow diagram of at least one embodiment of a method for training a confidence classifier.

Referring now to FIG. 4, in use, the system 100 (e.g., the cloud-based system 102) may execute a method 400 for training a confidence classifier. It should be appreciated that the particular blocks of the method 400 are illustrated by way of example, and such blocks may be combined or divided, added or removed, and/or reordered in whole or in part depending on the particular embodiment, unless stated to the contrary. In some embodiments, the method 400 is associated with a user conversation with an automated chat bot, personal bot, and/or other type of automated conversational system.

The illustrative method 400 begins with block 402 in which the system 100 (or, more specifically, the confidence classifier 112) receives a probability distribution of possible intents associated with an utterance. In other words, the probability distribution includes the corresponding probability that the user's utterance corresponds with each of the possible intents processed by the intent classifier 110 as described herein. In some embodiments, it should be appreciated that the system 100 may also process the user's input corresponding with the utterance as described above (e.g., via the intent classifier 110) in order to arrive at the probability distribution, whereas in other embodiments, the system 100 receives the probability distribution (e.g., as corresponding probabilities) from another system.

In block 404, the system 100 generates a plurality of measures of peakedness of the probability distribution. In some embodiments, to do so, the system 100 may execute the method 500 of FIG. 5 described in detail below, which leverages three different measures of peakedness of the probability distribution. However, it should be appreciated that a different number of measures of peakedness and/or different specific measures of peakedness of the probability distribution may be used in other embodiments.

In block 406, the system 100 trains the confidence classifier 112 using the plurality of measures of peakedness as features for classification. In the illustrative embodiment, the confidence classifier 112 outputs a single normalized probability of a most likely intent associated with the utterance based on the plurality of measures of peakedness of the probability distribution. In order to train the confidence classifier 112, the intent classifier 110 may be supplied with a positive example that represents a correct pairing of utterance Ui and intent label Li, and the set of features may be extracted (e.g., the plurality of measures of peakedness) and fed into the confidence classifier 112 with a target of 1.0 for the confidence classifier 112 to learn. Likewise, the intent classifier 110 may be supplied with a negative example that represents an incorrect pairing of utterance and a randomly chosen utterance from another class/label, and the set of features may be extracted (e.g., the plurality of measures of peakedness) and fed into the confidence classifier 112 with a target of 0.0 for the confidence classifier 112 to learn. This process may be repeated for multiple iterations (e.g., until all or a plurality of possibilities are exhausted) in order to train the confidence classifier 112.

In some embodiments, in block 408, the system 100 may tune parameters of the confidence classifier 112 using stochastic gradient descent optimization. In other embodiments, the system 100 may utilize one or more other algorithms for training the confidence classifier 112 using the plurality of measures of peakedness as features for classification.

After having been trained, it should be appreciated that a single number output by the confidence classifier 112 (e.g., in the range of 0.0 to 1.0) may be used by the system 100 (or another system) to classify real time intent data (associated with a user's utterance) using a single confidence threshold (e.g., in the range of 0.0 to 1.0). Accordingly, in the illustrative embodiment, the confidence threshold is not a moving target as in many other classification systems.

Although the blocks 402-408 are described in a relatively serial manner, it should be appreciated that various blocks of the method 400 may be performed in parallel in some embodiments.

Figure 5:
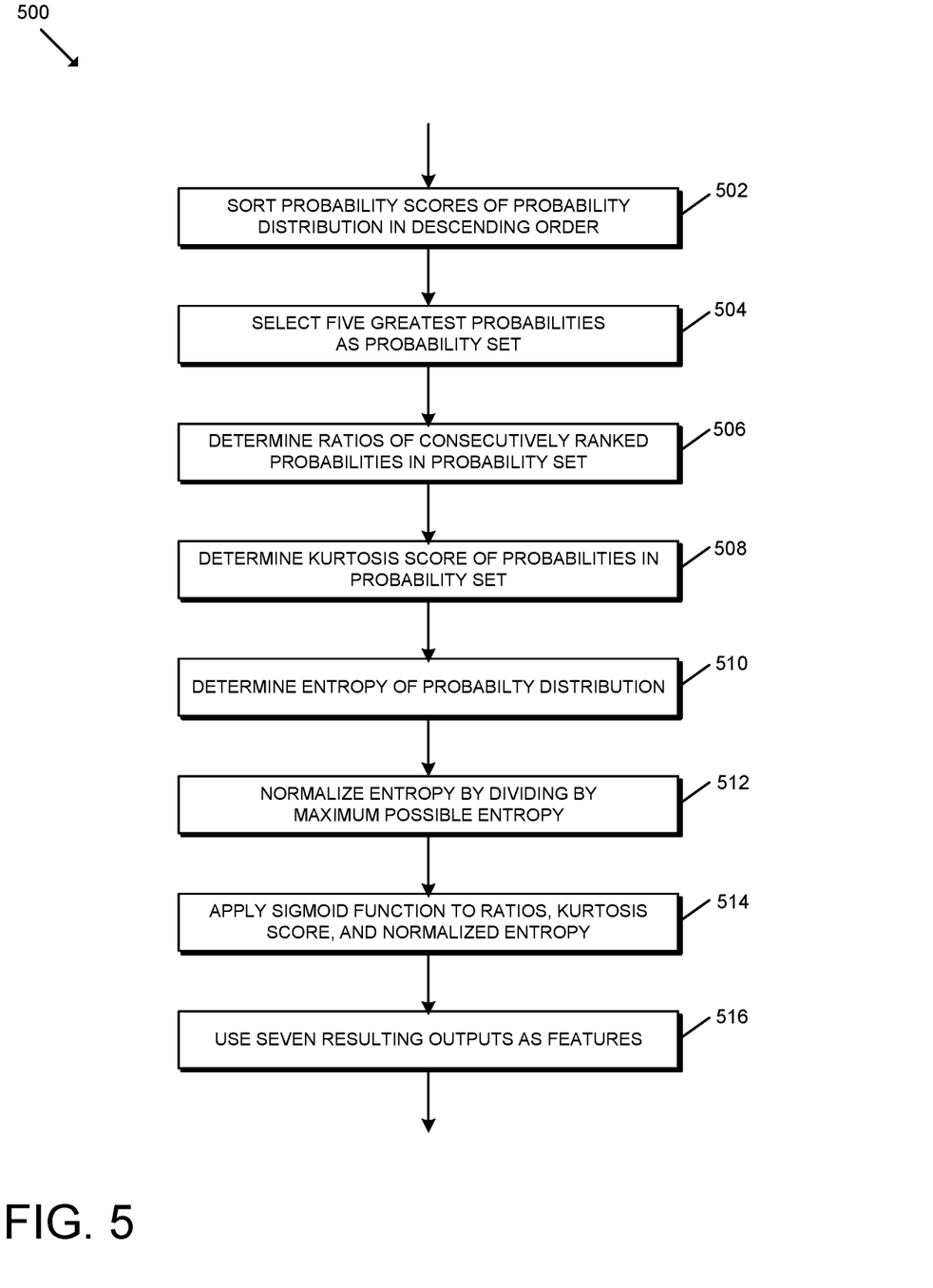
FIG. 5 is a simplified flow diagram of at least one embodiment of a method for generating measures of peakedness of a probability distribution.

Referring now to FIG. 5, in use, the system 100 may execute a method 500 for generating measures of peakedness of a probability distribution. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the system 100 sorts the probability scores of the probability distribution in descending order. In block 504, the system 100 selects the five greatest probabilities as a probability set (e.g., the first five probabilities in the sorted listed of probability scores). It should be appreciated that a different number of probabilities may be selected in various other embodiments (with corresponding modifications to the methods described herein). If there are fewer than five probability scores (or the other defined number of elements in the probability set) in the probability distribution, the system 100 pads the probability set with one or more small numbers (e.g., epsilon equal to 10 to the power of −6) to account for each missing score.

In block 506, the system 100 determines the ratios of the consecutively ranked probabilities in the probability set (including padding values, if applicable). For example, for a set of five probability scores ($x_i$), the system 100 calculates:

$$\frac{x_i}{x_{i+1}}$$

for all i from 1 to 4, wherein i represents the index. In block 508, the system 100 determines the kurtosis score of probabilities in the probability set. In particular, the kurtosis score may be calculated according to:

$$k = \frac{n\sum_{i=1}^{n}(x_i - \bar{x})^4}{\left(\sum_{i=1}^{n}(x_i - \bar{x})^2\right)^2} - 3$$

wherein i represents the index and n=5 (or the other defined number of elements in the probability set).

In block 510, the system 100 determines the entropy (e.g., Shannon's entropy) of the probability distribution. In particular, the entropy may be calculated according to:

$$H(X) = -\sum_{i=1}^{n} p_i \log_2 p_i$$

wherein i represents the index, n represents the number of probabilities/elements in the probability distribution, and $p_i$ represents the corresponding probability.

In block 512, the system 100 normalizes the entropy of the probability distribution by dividing the entropy by the maximum possible entropy of the probability distribution (i.e., generating a normalized entropy). It should be appreciated that the maximum possible entropy of the probability distribution is based on the number of elements in the probability distribution rather than the values of the elements themselves.

In block 514, the system 100 applies the sigmoid function to the ratios (from block 506), the kurtosis score (from block 508), and the normalized entropy (from block 512). The sigmoid function may be calculated according to:

$$sig(x) = \frac{1}{1 + e^{-x}} \quad \text{(x)}$$

Accordingly, the system 100 obtains six output values (e.g., floating point numbers) after the application of the sigmoid function. In block 516, the system 100 uses the six output values as features (e.g., by the confidence classifier 112).

Although the blocks 502-516 are described in a relatively serial manner, it should be appreciated that various blocks of the method 500 may be performed in parallel in some embodiments.

Figure 6:
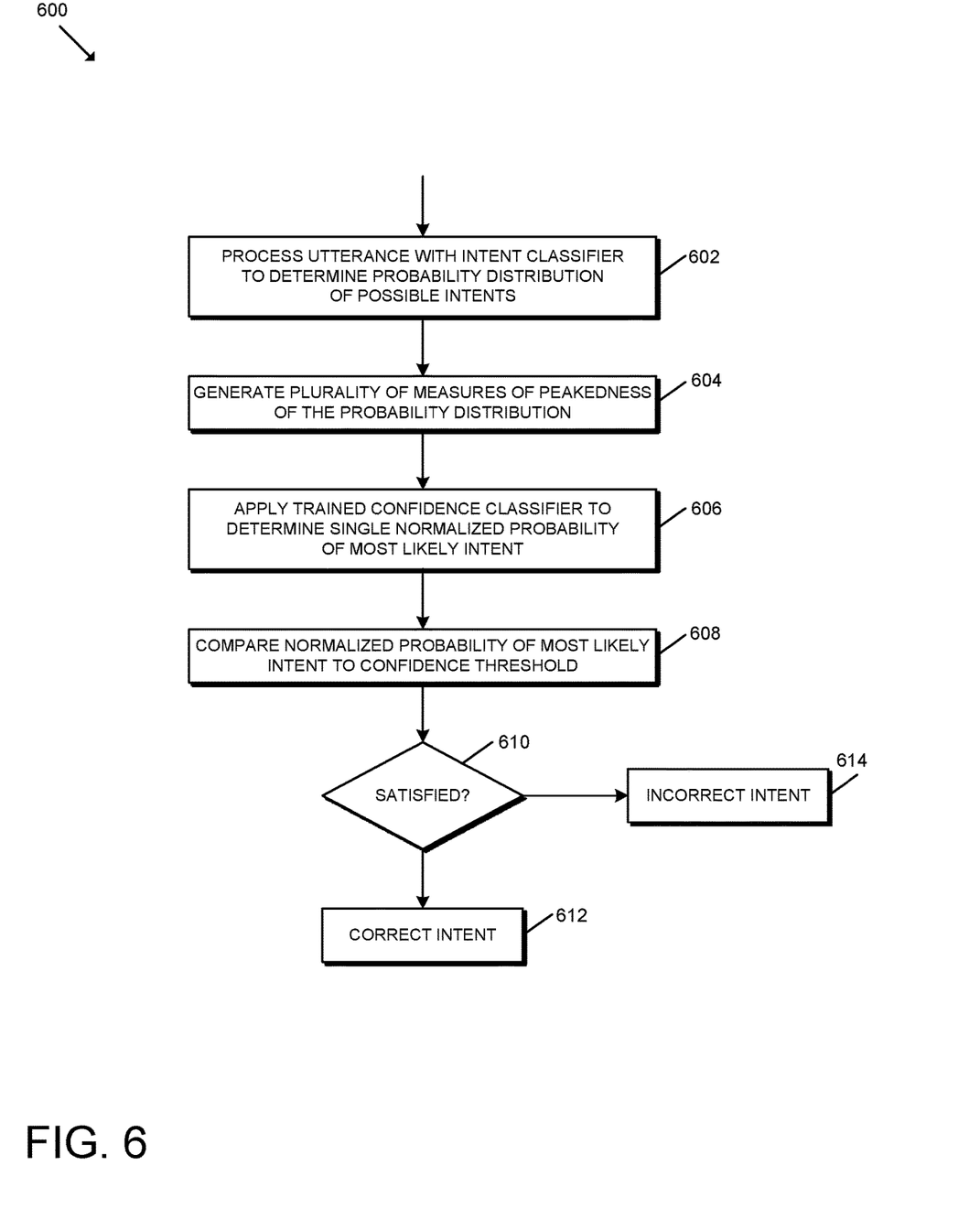
FIG. 6 is a simplified flow diagram of at least one embodiment of a method for using a trained confidence classifier to determine intent.

Referring now to FIG. 6, in use, the system 100 (e.g., the cloud-based system 102) may execute a method 600 for using a trained confidence classifier to determine intent (e.g., in real time). It should be appreciated that the particular blocks of the method 600 are illustrated by way of example, and such blocks may be combined or divided, added or removed, and/or reordered in whole or in part depending on the particular embodiment, unless stated to the contrary. In some embodiments, the method 600 is associated with a user conversation with an automated chat bot, personal bot, and/or other type of automated conversational system.

The illustrative method 600 begins with block 602 in which the system 100 processes an utterance with the intent classifier 110 to determine the probability distribution of the possible intents, and in block 604, the system 100 generates a plurality of measures of peakedness of the probability distribution (e.g., using the same measures of peakedness used to train the confidence classifier 112).

In block 606, the system 100 applies the trained confidence classifier 112 to determine a single normalized probability of the most likely intent associated with the utterance. For example, the confidence classifier 112 may use the plurality of measures of peakedness of the probability distribution as features in a manner similar to that described above. In block 608, the system 100 compares the normalized probability of the most likely intent to a confidence threshold. In the illustrative embodiment, the confidence threshold is predefined by the system. In some embodiments, the confidence threshold may be modified by a system administrator or other authorized party. As described above, in the illustrative embodiment, the use of the confidence classifier 112 and the single normalized probability output by the classifier 112 allows the system 100 to rely on a single confidence threshold (e.g., 50%, 60%, etc.) rather than a moving target, which is inherent in many other systems.

In block 610, the system 100 determines whether the confidence threshold is satisfied. If so, in block 612, the system 100 selects the most likely intent identified by the system 100 as the correct intent associated with the utterance; otherwise, in block 614, the system 100 determines that the most likely intent identified by the system 100 is the incorrect intent, or determines that there is insufficient information to be acceptably confident in the prediction. Accordingly, in some embodiments, the system 100 may request further information, prompt the user for additional clarifying information, and/or otherwise handle the inability of the system 100 to properly classify the user's utterance.

It should be further appreciated that if the system 100 determines that the most likely intent identified by the system 100 is the correct intent (e.g., in response to the confidence threshold being satisfied), the system 100 may perform one or more actions in response to the determination. For example, in an embodiment in which the system 100 is used in conjunction with an automated chat bot, the system 100 may execute one or more processes associated with the inferred intent and the automated chat bot may transmit to the user device 108 the results of those processes and/or other information associated therewith (e.g., as an automated "response" to the prompting utterance). In other words, in some embodiments, each of the possible intents handled by the classifiers 110, 112 may be mapped to, or may otherwise correspond with, one or more processes to be executed in response to a determination that the user's utterance corresponds with that intent.

Although the blocks 602-612 are described in a relatively serial manner, it should be appreciated that various blocks of the method 600 may be performed in parallel in some embodiments.

What is claimed is:

1. A method of applying a confidence classifier for intent classification in association with an automated chat bot, the method comprising:
    processing, by a computing system, an utterance with an intent classifier to determine a probability distribution of possible intents associated with the utterance;
    generating, by the computing system, a plurality of measures of peakedness of the probability distribution; and
    applying, by the computing system, a trained confidence classifier to determine a single normalized probability of a most likely intent associated with the utterance based on the plurality of measures of peakedness of the probability distributions;
    wherein generating the plurality of measures of peakedness of the probability distribution comprises:
        sorting probability scores of the probability distribution in descending order;
        selecting a subset of the greatest probabilities of the sorted probability scores as a probability set;
        determining a plurality of ratios of consecutively ranked probabilities in the probability set;
        determining a kurtosis score of the probabilities in the probability set;
        determining an entropy of the probability distribution; and
        normalizing the entropy of the probability distribution by dividing the entropy by a maximum possible entropy of the probability distribution to generate a normalized entropy.

2. The method of claim 1, further comprising comparing, by the computing system, the normalized probability of the most likely intent associated with the utterance to a confidence threshold.

3. The method of claim 2, further comprising:
    selecting, by the computing system, the most likely intent as an intent associated with the utterance in response to determining that the normalized probability of the most likely intent associated with the utterance satisfies the confidence threshold; and
    transmitting, by the computing system, a message to a user device in communication with the automated chat bot in response to selecting the most likely intent as the intent associated with the utterance, wherein the message is a response to the utterance.

4. The method of claim 1, wherein generating the plurality of measures of peakedness of the probability distribution comprises applying a sigmoid function to each of the plurality of ratios, the kurtosis score, and the normalized entropy.

5. The method of claim 1, wherein selecting the subset of the greatest probabilities of the sorted probability scores as the probability set comprises selecting five greatest probabilities of the sorted probabilities scores as the probability set.

6. The method of claim 1, further comprising training, by the computing system, the confidence classifier by tuning parameters using stochastic gradient descent optimization.

7. A system for applying a confidence classifier for intent classification in association with an automated chat bot, the system comprising:
   at least one processor; and
   at least one memory comprising a plurality of instructions stored thereon that, in response to execution by the at least one processor, causes the system to:
      process an utterance with an intent classifier to determine a probability distribution of possible intents associated with the utterance;
      generate a plurality of measures of peakedness of the probability distribution; and
      apply a trained confidence classifier to determine a single normalized probability of a most likely intent associated with the utterance based on the plurality of measures of peakedness of the probability distribution;
   wherein to generate the plurality of measures of peakedness of the probability distribution comprises to:
      rank probabilities of the probability distribution by greatest probability; and
      determine a plurality of ratios of consecutively ranked probabilities in response to ranking the probabilities of the probability distribution.

8. The system of claim 7, wherein the plurality of instructions further causes the system to compare the normalized probability of the most likely intent associated with the utterance to a confidence threshold.

9. The system of claim 8, wherein the plurality of instructions further causes the system to:
   select the most likely intent as an intent associated with the utterance in response to a determination that the normalized probability of the most likely intent associated with the utterance satisfies the confidence threshold; and
   transmit a message to a user device in communication with the automated chat bot in response to selection of the most likely intent as the intent associated with the utterance, wherein the message is a response to the utterance.

10. The system of claim 7, wherein the plurality of instructions further causes the system to train the confidence classifier by tuning parameters using stochastic gradient descent optimization.

11. A system for applying a confidence classifier for intent classification in association with an automated chat bot, the system comprising:
   at least one processor; and
   at least one memory comprising a plurality of instructions stored thereon that, in response to execution by the at least one processor, causes the system to:
      process an utterance with an intent classifier to determine a probability distribution of possible intents associated with the utterance;
      generate a plurality of measures of peakedness of the probability distribution; and
      apply a trained confidence classifier to determine a single normalized probability of a most likely intent associated with the utterance based on the plurality of measures of peakedness of the probability distribution;
   wherein to generate the plurality of measures of peakedness of the probability distribution comprises to:
      sort probability scores of the probability distribution in descending order;
      select a subset of the greatest probabilities of the sorted probability scores as a probability set;
      determine a plurality of ratios of consecutively ranked probabilities in the probability set;
      determine a kurtosis score of the probabilities in the probability set;
      determine an entropy of the probability distribution; and
      normalize the entropy of the probability distribution by dividing the entropy by a maximum possible entropy of the probability distribution to generate a normalized entropy.

12. The system of claim 11, wherein generating the plurality of measures of peakedness of the probability distribution comprises applying a sigmoid function to each of the plurality of ratios, the kurtosis score, and the normalized entropy.

13. The system of claim 11, wherein selecting the subset of the greatest probabilities of the sorted probability scores as the probability set comprises selecting five greatest probabilities of the sorted probabilities scores as the probability set.

14. The system of claim 11, wherein the plurality of instructions further causes the system to compare the normalized probability of the most likely intent associated with the utterance to a confidence threshold.

15. The system of claim 14, wherein the plurality of instructions further causes the system to:
   select the most likely intent as an intent associated with the utterance in response to a determination that the normalized probability of the most likely intent associated with the utterance satisfies the confidence threshold; and
   transmit a message to a user device in communication with the automated chat bot in response to selection of the most likely intent as the intent associated with the utterance, wherein the message is a response to the utterance.

16. The system of claim 11, wherein the plurality of instructions further causes the system to train the confidence classifier by tuning parameters using stochastic gradient descent optimization.

* * * * *